United States Patent

[11] 3,540,681

[72] Inventor Paolo Orazi
 Via S. Fiorano 1, Brescia, Italy
[21] Appl. No. 704,835
[22] Filed Feb. 12, 1968
 Continuation of Ser. No. 599,480,
 Dec. 6, 1966, abandoned
[45] Patented Nov. 17, 1970

[54] ROTARY WING CONSTRUCTION
 2 Claims, 3 Drawing Figs.
[52] U.S. Cl. .................................................. 244/39,
 170/160.5, 244/19
[51] Int. Cl. .................................................. B64c 27/02
[50] Field of Search .......................................... 244/8—10,
 16, 19—21, 39; 170/160.5

[56] References Cited
 UNITED STATES PATENTS
 991,331 5/1911 Lawrence ..................... 170/160.5
 1,766,472 6/1930 Wander ........................ 244/10

| 1,816,898 | 8/1931 | Few ............................ | 244/19 |
| 1,975,116 | 10/1934 | McIntyre ..................... | 244/19 |
| 2,176,185 | 10/1939 | Nelson ........................ | 244/9 |

FOREIGN PATENTS
 7,745 3/1909 Great Britain ............... 170/160.5
 420,897 12/1910 France ........................ 170/160.5

Primary Examiner—Milton Buchler
Assistant Examiner—Steven W. Weinrieb

ABSTRACT: A rotary wing assembly for aircraft has a wing mounted upon an aircraft fuselage for rotation about its span axis. The wing comprises a central spar extending spanwise and a plurality of transverse ribs attached symmetrically to said spar and spaced along the spar in a common plane. Sheets extend over the framework of the spar and ribs to provide a flying surface, the sheets covering only one surface of the ribs and extending on opposite surfaces thereof, with respect to the plane of the wing, as well as opposite sides of the span axis.

Patented Nov. 17, 1970 3,540,681

INVENTOR.
Paola Orazi

ROTARY WING CONSTRUCTION

This application is a continuation of application Ser. No. 599,480 filed Dec. 6, 1966 now abandoned.

This invention concerns improvements in or relating to aircraft. The invention provides a rotary wing assembly for aircraft, including a wing mounted on an aircraft fuselage for rotation about its span axis, said wing comprising a central spar extending spanwise, a plurality of transverse ribs attached symmetrically to said spar and spaced along the spar in a common plane, and sheet means extending over the framework of spar and ribs to provide a flying surface, the sheet means being arranged to cover one surface only of the ribs, and sheet means extending on opposite sides of the span axis being respectively located on opposite surfaces of the ribs, with reference to the plane of the wing. The design is such, to enhance the performance of said wing.

Figure 2:
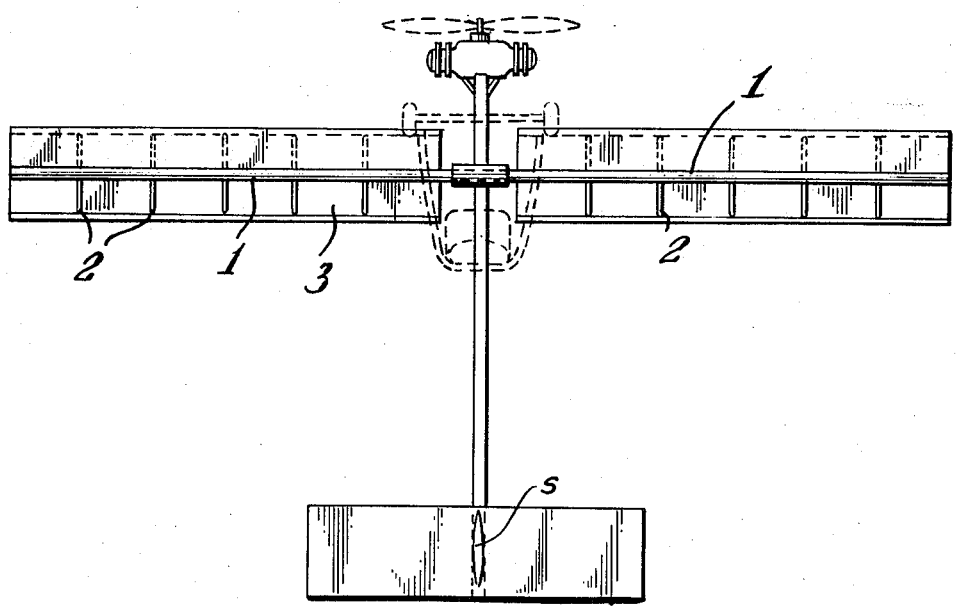
Figure 1:
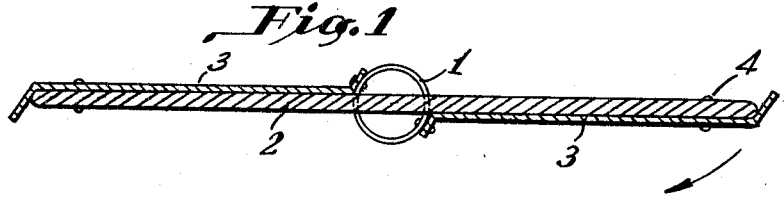
Figure 3:
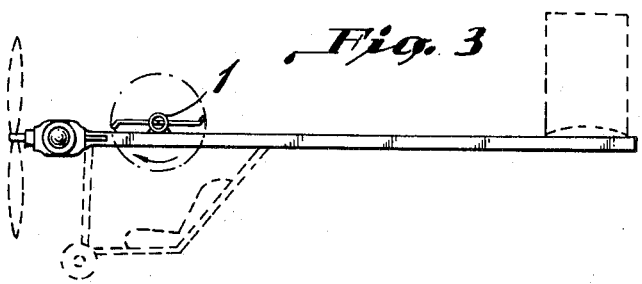

The invention is illustrated by way of example in the accompanying drawing, in which:

FIG. 1 is a sectional elevation of a wing assembly rotatable about its span axis, FIG. 2 is a plan view of an aircraft with a wing assembly as shown in FIG. 1 mounted thereon, and FIG. 3 is a side elevation of the aircraft shown in FIG. 2.

Referring to the drawing, the wing assembly comprises a framework comprising a central tubular spar 1 having diametrically opposed apertures through which extend transverse ribs 2. The flying surfaces of the wing are defined by two longitudinally extending sheets 3, each of which is attached to the spar 1 and ribs 2 on one side of the wing only, by means of screws or rivets 4. The free longitudinal edges of the sheets 3 are angled in opposite directions relatively to the plane of the wing.

The provision of sheets 3 only on one side of the wing is a necessary feature, since the weight of the wing is substantially reduced compared to one having such sheets applied to both sides thereof. However owing to the arrangement shown, in which the sheets 3 are arranged on opposite surfaces of the wing with reference to the plane thereof, the ribs 2 are not subject to air pressure and serve to assist rotation of the wing.

Moreover the arrangement of the wing relatively to the aircraft fuselage, as shown in the drawing, is such that during this rotation the sheet is maintained in position against the ribs by air pressure.

For example if at the right hand side of the wing as viewed in FIG. 1, the sheet 3 were located above the wing instead of below it, the sheet 3 would be torn off the ribs and off the spar in a direction opposite to that of the rotation of the wing.

In the structure according to the invention, however, the air pressure adds to the strength of the structure.

I claim:

1. A rotary wing assembly for an aircraft, including a wing mounted on an aircraft fuselage for rotation about its span axis, said wing consisting of a central spar extending spanwise, a plurality of transverse ribs attached symmetrically to said spar extending through said spar to both sides thereof and spaced along the spar in a common plane, and sheet means extending over the framework of spar and ribs to provide a flying surface, the sheet means being arranged to cover the leading surface only of the ribs, and said sheet means extending on opposite sides of the span axis being respectively located on opposite surfaces of the ribs, with reference to the plane of the wing.

2. An assembly as claimed in claim 1, in which the edges of the sheet means at the free extremities of said ribs are angled in opposite directions with reference to the plane of the wing.